United States Patent
Wandell et al.

(10) Patent No.: US 11,116,187 B2
(45) Date of Patent: Sep. 14, 2021

(54) METHOD AND APPARATUS FOR COLLECTING AND DECOMPRESSING LIVE SPECIMENS WITH A SUBMERSIBLE HYPERBARIC CHAMBER

(71) Applicant: California Academy of Sciences, San Francisco, CA (US)

(72) Inventors: Matt Wandell, Monterey, CA (US); William R. Shepherd, San Francisco, CA (US); Hudson T. Pinheiro, San Francisco, CA (US); Luiz A. Rocha, San Francisco, CA (US); Toshiro Chiang, San Francisco, CA (US)

(73) Assignee: California Academy of Sciences, San Francisco, CA (US)

( * ) Notice: Subject to any disclaimer, the term of this patent is extended or adjusted under 35 U.S.C. 154(b) by 351 days.

(21) Appl. No.: 16/267,943

(22) Filed: Feb. 5, 2019

(65) Prior Publication Data
US 2020/0245599 A1 Aug. 6, 2020

(51) Int. Cl.
*A01K 63/04* (2006.01)
*A01K 1/03* (2006.01)
(Continued)

(52) U.S. Cl.
CPC .............. *A01K 63/047* (2013.01); *A01K 1/03* (2013.01); *A01K 29/005* (2013.01); *B65D 81/20* (2013.01);
(Continued)

(58) Field of Classification Search
CPC ........ A01K 61/10; A01K 61/13; A01K 63/02; A01K 63/003; A01K 63/00; A01K 63/047;
(Continued)

(56) References Cited

U.S. PATENT DOCUMENTS

| 4,201,153 | A | * | 5/1980 | Nace | .................. | A01K 63/00 |
| | | | | | | 119/224 |
| 4,844,012 | A | * | 7/1989 | Jerrett | .................. | G02B 6/4401 |
| | | | | | | 119/203 |

(Continued)

OTHER PUBLICATIONS

Welsh, Hyperbaric Chambers for Fish, Diving for Science, Proceedings of the American Academy of Underwater Sciences 31st Symposium, 2012, pp. 1-6, Dauphin Island, AL.
(Continued)

*Primary Examiner* — Tien Q Dinh
*Assistant Examiner* — Kevin M Dennis
(74) *Attorney, Agent, or Firm* — Nayyer J. Siddiqi; Quinn IP Law (57) ABSTRACT

Apparatus and method for collecting and decompressing one or more live specimens from a relatively high-pressure environment. The apparatus includes at least one hyperbaric chamber having an inner jar and an outer jar, the inner jar being insertable into the outer jar. A pump is configured to provide a pressurized fluid to the hyperbaric chamber. The inner and outer jars are respectively dimensioned such that an annular gap is created between them when the inner jar is inserted into the outer jar. The annular gap is configured as a return path for the pressurized fluid to travel from a second outer end to a first outer end of the outer jar. At least one pressure control valve is operatively connected to and configured to control an internal pressure of the hyperbaric chamber. The pressure control valve is selectively adjusted to decompress the live specimens.

8 Claims, 5 Drawing Sheets

(51) Int. Cl.
  *B65D 81/20* (2006.01)
  *A01K 63/02* (2006.01)
  *B65B 31/02* (2006.01)
  *B63C 11/32* (2006.01)
  *A01K 29/00* (2006.01)

(52) U.S. Cl.
  CPC ............... *A01K 63/02* (2013.01); *B63C 11/32* (2013.01); *B65B 31/02* (2013.01)

(58) Field of Classification Search
  CPC ...... A01K 63/04; A01K 63/042; B63C 11/32; B63C 11/325; B65B 31/021; B65B 31/025; B65B 31/04
  USPC .......................................... 119/224, 225, 203
  See application file for complete search history.

(56) References Cited

U.S. PATENT DOCUMENTS

| | | | | |
|---|---|---|---|---|
| 4,965,955 A * | 10/1990 | Campbell | ............... | A01K 63/02 119/201 |
| 5,467,764 A * | 11/1995 | Gamow | ............... | A61G 10/026 128/200.24 |
| 5,806,708 A * | 9/1998 | Schwab | ............... | A45C 11/008 220/378 |
| 6,213,335 B1 * | 4/2001 | Wilson | ............... | B65D 3/06 206/517 |
| 6,820,767 B2 * | 11/2004 | Nicholas | ............ | A47G 19/2205 222/132 |
| 8,789,495 B2 * | 7/2014 | Fuhr | ............... | A01N 1/0284 119/201 |
| 9,457,348 B2 * | 10/2016 | Clavaguera | ........... | G01N 1/2205 |
| 9,516,866 B2 * | 12/2016 | ElHage | ................. | A01K 63/00 |
| 9,987,183 B2 * | 6/2018 | Yoon | ..................... | A62B 31/00 |
| 10,190,951 B2 * | 1/2019 | Clavaguera | .......... | G01N 1/2205 |
| 2005/0109381 A1 * | 5/2005 | Mosteller | ............. | B63C 11/325 135/97 |
| 2012/0079990 A1 * | 4/2012 | Fuhr | ..................... | A01N 1/0221 119/201 |

OTHER PUBLICATIONS

Shepherd, et al., SubCAS: A Portable, Submersible Hyperbaric Chamber to Collect Living Mesophotic Fishes, Frontiers in Marine Science, Jun. 2018, pp. 1-11, vol. 5, Article 187.

* cited by examiner

METHOD AND APPARATUS FOR COLLECTING AND DECOMPRESSING LIVE SPECIMENS WITH A SUBMERSIBLE HYPERBARIC CHAMBER

INTRODUCTION

The present disclosure relates to a method and apparatus for collecting and decompressing one or more live specimens from a relatively high-pressure environment, with a submersible hyperbaric chamber. The live specimens may be from a habitat deep within an ocean. It is a challenging task to survive a trip to the surface as the live specimens may be sensitive to changes in temperature, light levels, oxygen concentrations and pressure. Ascending too rapidly may cause a variety of physical and physiological effects, such as exophthalmia, swim-bladder overexpansion or rupture, subcutaneous gas bubbles, emboli and hematoma. Additionally, divers coping with the difficulty of accessing the high-pressure environment and catching the live specimens may be required to exit the bottom fairly rapidly, further challenging the safe transportation of the live specimens.

SUMMARY

Disclosed herein is an apparatus for and method of collecting and decompressing one or more live specimens from a relatively high-pressure environment. The apparatus includes at least one hyperbaric chamber configured to be submersible in the relatively high-pressure environment. The hyperbaric chamber has an inner jar insertable into an outer jar. A chamber cap is configured to fit over a first outer end of the outer jar and seal the hyperbaric chamber. A pump is configured to provide a pressurized fluid for circulation through the hyperbaric chamber. At least one pressure control valve is operatively connected to and configured to control an internal pressure of the hyperbaric chamber. The pressure control valve is selectively adjusted to decompress the live specimens.

The inner and outer jars are respectively dimensioned such that an annular gap is created between the inner jar and the outer jar when the inner jar is inserted into the outer jar. The inner jar is configured with a first set of holes and a second set of holes at a first inner end and a second inner end, respectively, such that the pressurized fluid enters the inner jar through the first set of holes and exits the inner jar through the second set of holes. The annular gap is configured as a return path for the pressurized fluid exiting the second set of holes to travel from the second outer end to the first outer end of the outer jar. In one example, the annular gap is between 2 cm and 5 cm.

The apparatus may include an inlet conduit and an outlet conduit each operatively connected to the hyperbaric chamber such that the pressurized fluid enters the at least one hyperbaric chamber through the inlet conduit and exits the at least one hyperbaric chamber through the outlet conduit. The chamber cap has a first port configured to receive the inlet conduit and a second port configured to receive the outlet conduit. In one embodiment, the inlet conduit and the outlet conduit are configured to withstand a respective pressure of at least 6.9 bar.

The inner jar and the outer jar may have a substantially cylindrical shape, with the outer jar having an outer body between the first outer end and the second outer end and the inner jar having an inner body between a first inner end and the second inner end. The outer body of the outer jar and the inner body of the inner jar may be at least partially composed of a transparent material to enable viewing of the contents of the inner jar.

A shield may be operatively connected to the second port, the shield having a first wing at least partially encapsulating a first side of the second port and a second wing at least partially encapsulating a second side of the second port. A controller may be in communication with the at least one pressure control valve, the controller including a processor and tangible, non-transitory memory on which instructions may be recorded. Execution of the instructions by the processor causes the controller to selectively adjust the pressure control valve by respective predefined increments at respective predefined time intervals.

An electronic supply pack is configured to supply power to the pump and including multiple components placed in a sealed membrane. The multiple components may include a battery pack, a battery charger, a relay module, a converter module, and a noise-control module. A respiration sensor may be operatively connected to the hyperbaric chamber and configured to monitor a health status of the live specimens.

The method of collecting and decompressing the live specimens from a relatively high-pressure environment includes providing at least one hyperbaric chamber with an inner jar insertable into an outer jar. The live specimens are collected and placed in the inner jar at a first location, via an opening in the inner jar. The hyperbaric chamber is moved to a second location and the inner jar is inserted into the outer jar. The method includes attaching a chamber cap on a first outer end of the outer jar and sealing the hyperbaric chamber. The hyperbaric chamber is moved to a third location and a pressurized fluid is circulated through the hyperbaric chamber. In one example, the first location is at a depth of between 60 meters and 150 meters below a surface, the second location is at a depth of between 50 meters and 59 meters below the surface and the third location is above the surface.

Prior to fitting the chamber cap on the first outer end of the outer jar, an air bubble is blown into a cavity in the chamber cap. This maintains the internal pressure in the hyperbaric chamber during ascent. The method includes providing the first inner end and the second inner end of the inner jar with a first set of holes and a second set of holes, respectively, such that the pressurized fluid enters the inner jar through the first set of holes in a first direction and exits the inner jar through the second set of holes.

The method includes respectively dimensioning the inner jar and the outer jar to leave an annular gap between the inner jar and the outer jar when the inner jar is inserted into the outer jar. The annular gap is configured as a return path for the pressurized fluid exiting the second set of holes to travel in a second direction opposing the first direction. The method includes operatively connecting at least one pressure control valve to the hyperbaric chamber, the at least one pressure control valve being configured to control an internal pressure of the hyperbaric chamber. The live specimens are decompressed by selectively adjusting the at least one pressure control valve.

The above features and advantages and other features and advantages of the present disclosure are readily apparent from the following detailed description of the best modes for carrying out the disclosure when taken in connection with the accompanying drawings.

DETAILED DESCRIPTION

Figure 1:
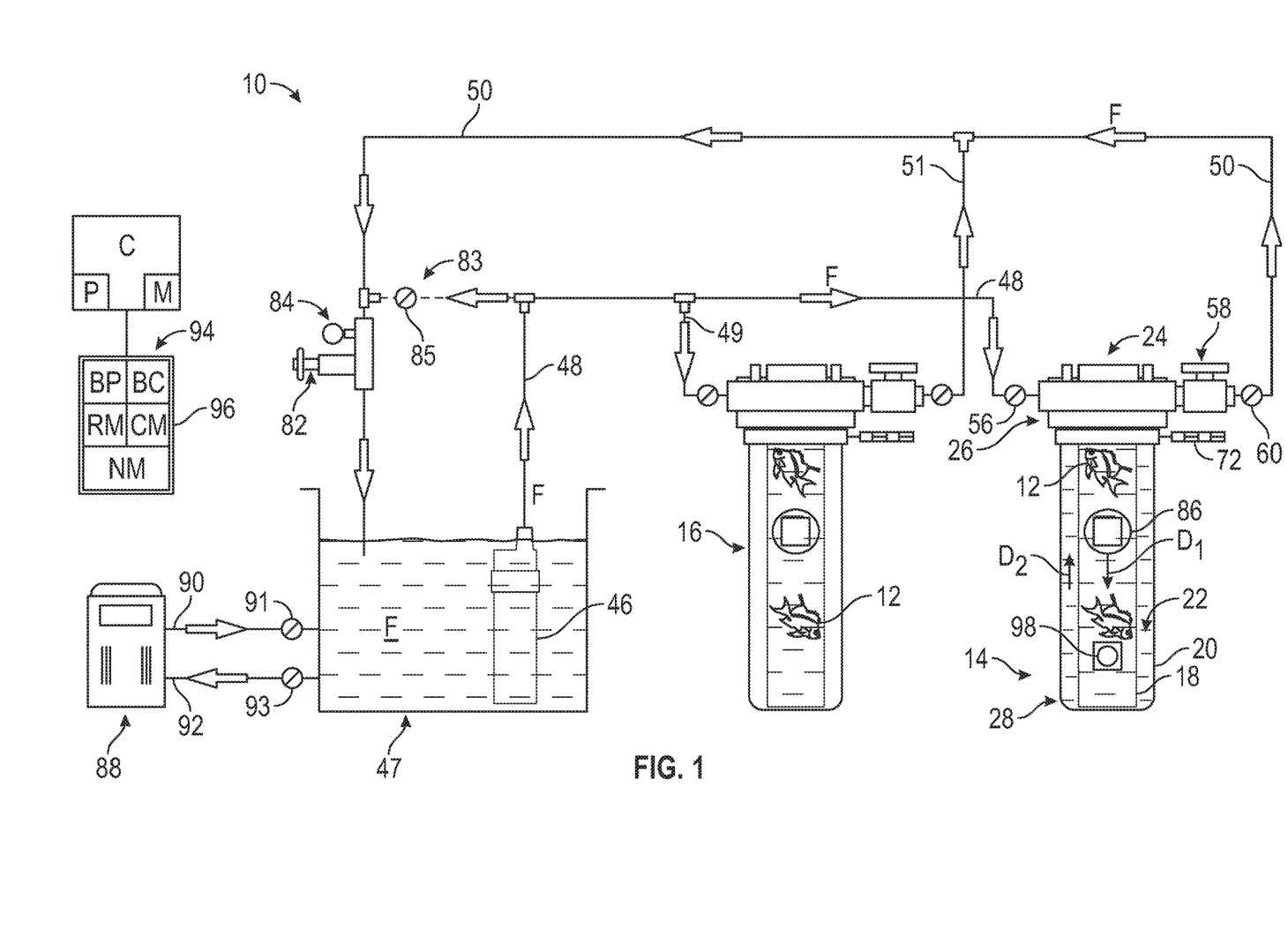
FIG. 1 is a schematic illustration of an apparatus for collecting and decompressing live specimens from a relatively high-pressure environment with a hyperbaric chamber having a chamber cap, an inner jar and an outer jar.

Referring to the drawings, wherein like reference numbers refer to like components, FIG. 1 schematically illustrates an apparatus 10 for collecting and decompressing one or more live specimens 12 from a relatively high-pressure environment. Referring to FIG. 1, the apparatus 10 includes at least one hyperbaric chamber 14. In the example shown in FIG. 1, the apparatus 10 includes a second hyperbaric chamber 16, with a structure similar to the hyperbaric chamber 14. It is to be understood that any number of hyperbaric chambers may be employed. The live specimens 12 may include, but are not limited to, individual animals, plants, or single-celled life forms.

Figure 2:
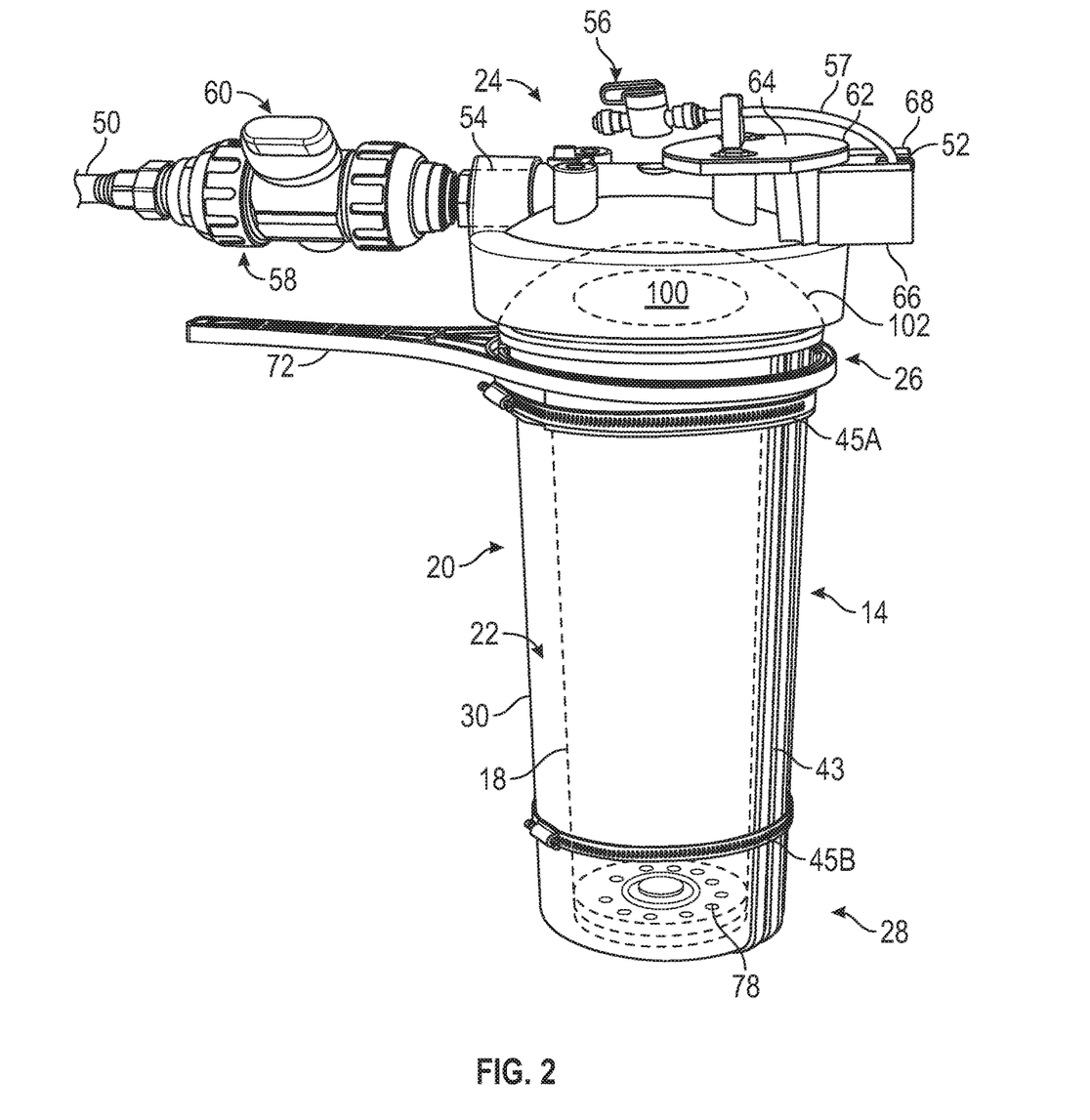
FIG. 2 is a schematic perspective illustration of the hyperbaric chamber of FIG. 1.

FIG. 2 is a schematic perspective illustration of the hyperbaric chamber 14. Referring to FIGS. 1 and 2, the hyperbaric chamber 14 includes an inner jar 18, and an outer jar 20. The inner jar 18 is configured to be inserted into the outer jar 20. The inner jar 18 and the outer jar 20 are respectively dimensioned to create an annular gap 22 when the inner jar 18 is inserted into the outer jar 20. In other words, the inner diameter of the outer jar 20 is greater than the outer diameter of the inner jar 18 by the size of the annular gap 22. The size of the annular gap 22 may be varied based on the application at hand. In one example, the annular gap 22 is between 2 cm and 5 cm.

Figure 3:
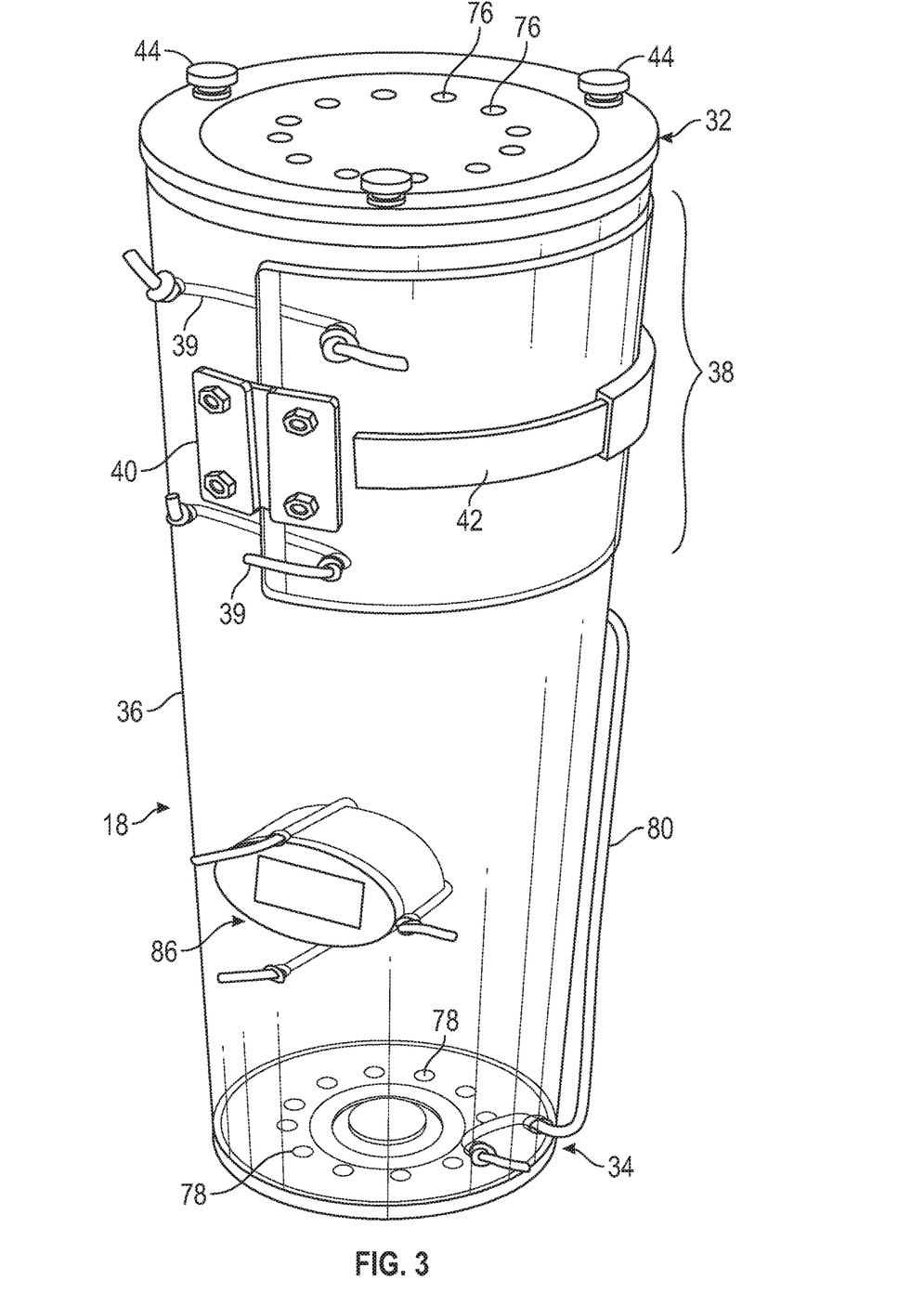
FIG. 3 is a schematic perspective illustration of the inner jar of FIG. 1.
Figure 4:
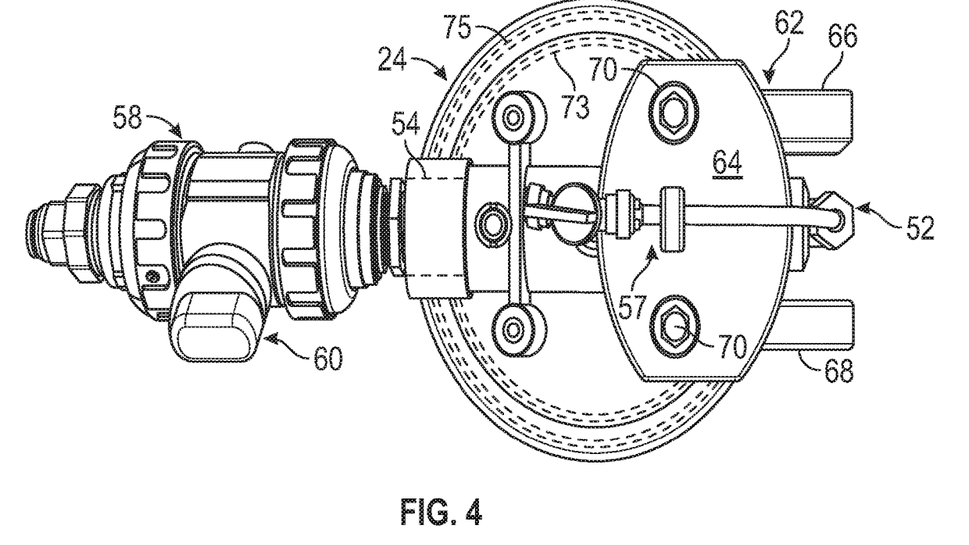
FIG. 4 is a schematic plan view of the chamber cap of FIG. 2.

Referring to FIGS. 1 and 2, a chamber cap 24 is configured to fit over the outer jar 20. FIG. 3 is a schematic perspective view of the inner jar 18. FIG. 4 is a schematic plan view of the chamber cap 24. Referring to FIGS. 1-3, the inner jar 18 and the outer jar 20 may have a substantially cylindrical shape. As shown in FIG. 2, the outer jar 20 has a first outer end 26 and a second outer end 28 between an outer body 30. As shown in FIG. 3, the inner jar 18 includes a first inner end 32 and a second inner end 34 between an inner body 36. The first inner end 32 may be completely removed from the inner body 36 by unscrewing a plurality of screws 44.

The outer body 30 (see FIG. 2) of the outer jar 20 and the inner body 36 (see FIG. 3) of the inner jar 18 may each include an overlapping portion (e.g. a window) composed of a transparent material such that the contents of the inner jar 18 are visible. This allows the live specimens 12 to be visually monitored. In the embodiment shown, the outer body 30 and the inner body 36 are each entirely composed of a transparent material. In one example, the outer body 30 is composed of polypropylene and the inner body 18 is composed of acrylic. The outer jar 20 may be configured with a working pressure rating suitable for the application at hand, such as for example, 6.9 bar. As described below, this allows pressurization at an intermediate depth 112 (see FIG. 5) where divers may briefly pause during ascent.

The hyperbaric chamber 14 is configured to be submersible, i.e., to withstand the pressure of the relatively high-pressure environment. In one example, referring to FIG. 5, the relatively high-pressure environment may be a first location $L_1$ at a depth between 60 meters and 150 meters below an ocean surface 108, with the live specimens 12 being fish. It is to be understood that the term ocean is intended to refer to any large body of water the relatively high-pressure environment is below an ocean or other body of water. In freshwater, this corresponds to a pressure of between 5.9 bar and 14.7 bar. In saltwater, this corresponds to a pressure of between 6.0 bar and 15.1 bar. A corresponding method 200 of collecting and decompressing the live specimens 12 is described below with reference to FIG. 6.

Referring back to FIG. 3, the inner jar 18 may include a door 38 movable through a hinge 40. Divers may add the live specimens 12 to the inner jar 18 through the door 40. Referring to FIG. 3, a spring element 39 is operatively connected to the door 38 to urge the door 38 to its closed position. Referring to FIG. 3, the door 38 may be secured with a lock 42. In one example, the lock 42 is made of a material such as Velcro. Referring to FIG. 3, the inner jar 18 may include a cord 80 for efficient handling. Referring to FIG. 2, the outer body 30 may be formed with longitudinally-extending ridges or corrugations 43 to provide a robust non-grip surface. Referring to FIG. 2, a first attachment 45A and a second attachment 45B may be positioned circumferentially around the outer body 30 in proximity to the first outer end 26 and second outer end 28, respectively, as shown in FIG. 2.

Referring to FIG. 1, a pump 46 is configured to provide a pressurized fluid F, such as freshwater or saltwater for example, to be circulated through the hyperbaric chamber 14. Referring to FIG. 1, an inlet conduit 48 and an outlet conduit 50 are each operatively connected to the hyperbaric chamber 14, such that the pressurized fluid F is channeled into the hyperbaric chamber 14 via the inlet conduit 48 and discharged from the hyperbaric chamber 14 through the outlet conduit 50. In one example, the inlet conduit 48 is composed of a plastic tube with a 6 mm diameter and the outlet conduit 50 is composed of a plastic tube with a 12-mm diameter. The supply of pressurized fluid F may be routed to multiple hyperbaric chambers in parallel with connectors 49, shown in FIG. 1. The inlet conduit 48 and the outlet conduit 50 may be configured to withstand a respective pressure of at least 6.9 bar. In one embodiment, the inlet conduit 48 and outlet conduit 50 have a pressure rating of 10.3 bar. The structure and size of the inlet conduit 48 and the outlet conduit 50 may be selected based on the application at hand.

Referring to FIGS. 2 and 4, the chamber cap 24 includes two integrally formed ports, a first port 52 and a second port 54. The first port 52 is configured to receive the inlet conduit 48 (see FIG. 1) via a first fitting 57 (see FIGS. 2 and 4). Referring to FIG. 2, the second port 54 is configured to receive the outlet conduit 50 via second fitting 58 (see also FIG. 4). Referring to FIGS. 1 and 2, a first valve 56 and a second valve 60 are employed to control fluid flow entering and exiting the hyperbaric chamber 14, respectively.

In the embodiment shown in FIGS. 2 and 4, the second valve 60 is a true-union valve plumbed into the second port 54 and the second fitting 58 is a true-union fitting. Other fittings available to those skilled in the art may be employed. The fluid F leaves the hyperbaric chamber 14 through the second valve 60, which also serves as a convenient handle for divers to use when closing and pressurizing the hyperbaric chamber 14. The second fitting 58 on the downstream side is configured to be easily removed and swapped with other fittings while keeping the second valve 60 closed and the hyperbaric chamber 14 pressurized. This creates a convenient connection point for divers to attach a low-pressure hose (not shown) from a small SCUBA cylinder to re-pressurize the hyperbaric chamber 14 in the event that they encounter a slow leak upon ascent.

Referring to FIGS. 2 and 4, a shield 62 is employed to cover and protect the first fitting 57 and first port 52. Referring to FIG. 4, the shield 62 includes a body portion 64 attached to a first wing 66 and a second wing 68. The first wing 66 and the second wing 68 extend in a plane perpendicular to a plane defined by the body portion 64. As shown in FIG. 4, the first wing 66 is configured to at least partially encapsulate or cover one side of the first port 52 and the second wing 68 is configured to at least partially encapsulate or cover another side of the first port 52. The shield 62 may be 3D-printed or otherwise manufactured from a plastic, polymer or other sufficiently rigid material. The shield 62 may be attached by bolts 70 to the chamber cap 24. Alternatively, the shield 62 may be integrally formed with the chamber cap 24.

Referring to FIG. 2, the hyperbaric chamber 14 may be sealed by attaching the outer jar 20 into the chamber cap 24, such as by screwing into a cavity 102, and tightening with a housing wrench 72 (shown in FIGS. 1 and 2). The cavity 102 in the chamber cap 24 may be threaded. Referring to FIG. 4, a first O-ring 73 and a second O-ring 75 may be respectively set in the chamber cap 24 and a groove at the first outer end 26 (see FIG. 2) of the outer jar 20 in order to seal the hyperbaric chamber 14. The chamber cap 24 may include a pressure-relief button configured to rapidly reduce pressure, which may be disabled if needed.

Referring to FIG. 3, the first inner end 32 and the second inner end 34 of the inner jar 18 are configured with a first set of holes 76 and a second set of holes 78, respectively. Referring to FIG. 1, this enables the pressurized fluid F to flow along a first direction $D_1$ through the length of the inner jar 18. In other words, the pressurized fluid F enters the inner jar 18 through the first set of holes 76 and exits the inner jar 18 through the second set of holes 78. Referring to FIG. 1, the annular gap 22 is configured as a return path for the pressurized fluid F exiting the second set of holes 76 to travel along a second direction $D_2$, opposite to the first direction $D_1$.

Referring to FIG. 1, a pressure control valve 82 is configured to control the internal pressure of the hyperbaric chamber 14, which equates to the virtual depth of the living specimens 12 within the hyperbaric chamber 14. Referring to FIG. 1, the internal pressure may be monitored by an in-line pressure gauge 84 located adjacent to the pressure control valve 82, as well as a submersible depth gauge 86 (see also FIG. 3) located on the inner jar 18. The pressure control valve 82 is selectively adjusted to decompress the live specimens 12. In order to overcome back pressure, the apparatus 10 may include a bypass mechanism 83 with a bypass valve 85 configured to be opened at the end of a decompression phase, which enables a reduction of pressure down to near-ambient conditions.

Referring to FIG. 1, the pump 46 may draw the pressurized fluid F from a reservoir 47, which may filtered and temperature-controlled. Referring to FIG. 1, fluid exchanges to dilute nitrogenous wastes from the fluid F may be performed by removing fluid F from the reservoir 47, via an output line 92 connected to a supply 88. The reservoir 47 may receive fresh fluid from the supply 88, via input line 90. In one example, the supply 88 provides fresh seawater matching the temperature, oxygenation level and salinity optimal for the live specimens 12. Valves 91, 93 may be respectively connected to the input line 90 and the output line 92 to control direction of flow.

Referring to FIG. 1, an electronic supply pack 94 is configured to supply and control power to the pump 46. The electronic supply pack 94 may be taken underwater and includes multiple components placed in a sealed membrane 96. The electronic supply pack 94 may include a battery pack BP and a battery charger BC for charging the battery pack BP. The battery charger BC may be powered with AC power from a wall unit on the surface 114 (third location $L_3$). The electronic supply pack 94 may include a noise-control module NM to filter noise in the AC power supply, a relay module RM for controlling current flow and a converter module CM for utilizing 110V and 220V power supply.

Figure 5:
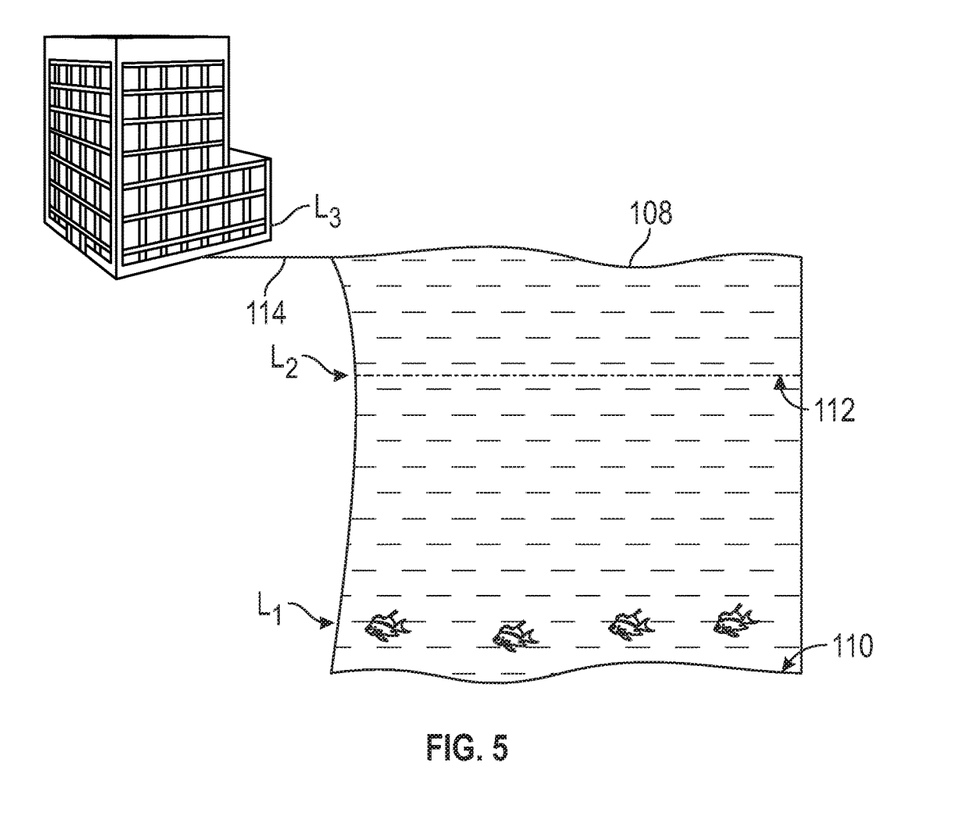
FIG. 5 is a schematic diagram of multiple locations with varying pressure.
Figure 6:
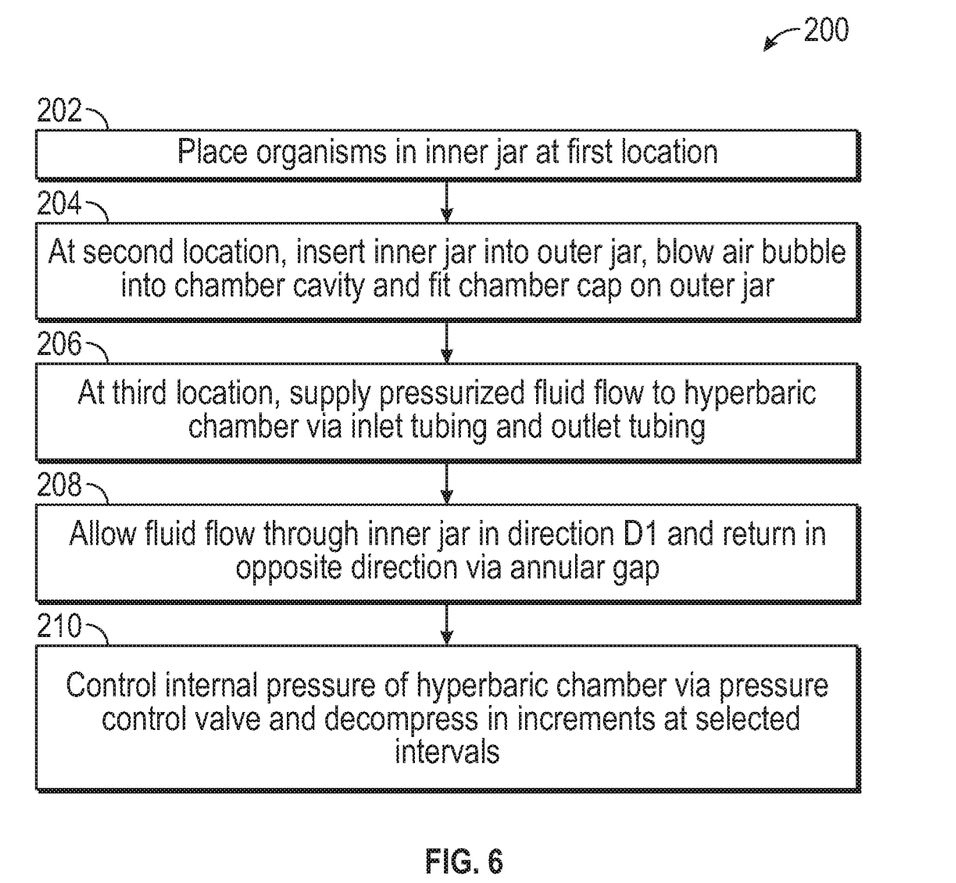
FIG. 6 is a schematic flow diagram for a method of collecting and decompressing live specimens with the hyperbaric chamber of FIG. 1.

Referring now to FIG. 6, a schematic flow diagram of the method 200 of collecting and decompressing one or more live specimens 12 from a relatively high-pressure environment is shown. The inner jar 18 is transported to a first location $L_1$ below the ocean surface 108 (see FIG. 5). In one example, the first location $L_1$ is at a mesophotic depth of between 60 meters and 150 meters below the ocean surface 108. Per block 202 of FIG. 6, the method 200 includes collecting and placing the live specimens 12 in the inner jar 18 at the first location $L_1$. The live specimens 12 may be collected using hand nets, for example.

Per block 204, the method 200 includes moving to a second location $L_2$ at an intermediate depth 112 (see FIG. 5), where the inner jar 18 is inserted into the outer jar 20. In one example, the intermediate depth 112 is between approximately 55 m and 59 m. The diver blows an air bubble 100 into a cavity 102 in the chamber cap 24 and attaches the chamber cap 24 onto the outer jar 20. The air bubble 100 expands during ascent and maintains the internal pressure in the hyperbaric chamber 14. In one example, air bubble 100 is approximately 300 $cm^3$ in volume. Once sealed properly, the hyperbaric chamber 14 is configured to maintain a pressure of approximately 6-7 bar for the duration of the ascent.

Per block 206 of FIG. 6, the method 200 includes moving to a third location $L_3$, above the ocean surface 108, i.e., on land 114 (see FIG. 5). In one example, a support dive team may meet the mesophotic dive team (arriving from location $L_1$) at a hand-off location, where the mesophotic dive team hands over the hyperbaric chamber 14 to the support dive team. For example, the live specimens may be collected at 150 m depth, then moved to 60 m depth to seal up the hyperbaric chamber 14. The mesophotic dive team may then move again to 27-30 m depth to hand off the hyperbaric chamber 14 to the support dive team, which then brings the hyperbaric chamber 14 up to the surface 114. At the surface 114, pressurized fluid F from the pump 46 is circulated through the hyperbaric chamber 14 via the inlet conduit 48 and the outlet conduit 50, as shown in FIG. 1. Per block 208 of FIG. 6, the method 200 includes enabling circulation of the pressurized fluid F through the length of the inner jar 18 in a first direction $D_1$ and returning in a second direction $D_2$ via the annular gap 22 (see FIG. 1). The support dive team may power the pump 46 via the battery pack BP or with an AC power supply through a wall unit. The pump 46 maintains pressure and provides clean, oxygenated water to the live specimens 12 inside the inner jar.

Per block 210 of FIG. 6, the method 200 includes controlling the internal pressure of the hyperbaric chamber 14 and decompressing via the pressure control valve 82 of FIG. 1. Referring to FIG. 1, the internal pressure may be continuously monitored by at least one of the submersible depth gauge 86 located within the hyperbaric chamber 14 and the in-line pressure gauge 84. Decompression may be performed by opening the pressure control valve 82 in increments at respective set time intervals and targeting a specific depth reduction, as measured by the submersible depth gauge 86.

The increments and respective time intervals of decompression may be varied based on the response or health status of the live specimens 12. Referring to FIG. 1, the health status of the live specimens 12 may be monitored via a respiration sensor 98 embedded in the hyperbaric chamber 14. Alternatively, the health status of the live specimens 12 may be monitored by visual inspection. As noted above, the transparent walls of the hyperbaric chamber 14 allow observation of the live specimens 12, and monitoring and management of stress during decompression. If signs of stress, such as a high respiratory rate, listing, or excessive buoyancy are observed, the live specimens 12 may be compressed back down in increments until they recover, and then decompression resumed.

Referring to FIG. 1, the apparatus 10 may include a controller C in communication (e.g., in electronic communication) with the pressure control valve 82. The controller C includes at least one processor P and at least one memory M (or non-transitory, tangible computer readable storage medium) on which instructions may be recorded for controlling the apparatus 10. The memory M can store controller-executable instruction sets, and the processor P can execute the controller-executable instruction sets stored in the memory M. The controller C may be configured to selectively adjust the pressure control valve 82 by respective predefined increments at respective predefined time intervals, which may be stored in a look-up table or other data repository. The respective predefined increments may be linked to data from the respiration sensor 98.

In order to overcome any back pressure generated by the system, at the end of the decompression, chamber operators may open the bypass valve 85 (see FIG. 1), which enables a reduction of pressure down to near-ambient conditions. The live specimens 12 are considered to have survived decompression if they are alive at the time of their release from the hyperbaric chamber 14.

In summary, the apparatus 10 and the method 200 provide numerous technical advantages to collecting and decompressing live specimens 12 from a high-pressure environment. The hyperbaric chamber 12 is compact enough to carry and efficiently operated by mesophotic divers, who are already burdened by numerous pieces of equipment such as a rebreather, several SCUBA cylinders of emergency bailout gases, various safety and collecting gear, and diver propulsion vehicles.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of collecting and decompressing one or more live specimens from a relatively high-pressure environment, the method comprising:
providing at least one hyperbaric chamber with an inner jar insertable into an outer jar and respectively dimensioning the inner jar and the outer jar to leave an annular gap between the inner jar and the outer jar when the inner jar is inserted into the outer jar;
collecting and placing the one or more live specimens in the inner jar at a first location, via an opening in the inner jar;
moving the at least one hyperbaric chamber to a second location and inserting the inner jar into the outer jar;
attaching a chamber cap on a first outer end of the outer jar, the chamber cap having a first port and a second port;
moving the at least one hyperbaric chamber to a third location and supplying a pressurized fluid to the at least one hyperbaric chamber;
providing a first inner end and a second inner end of the inner jar with a first set of holes and a second set of holes, respectively, such that the pressurized fluid enters the inner jar through the first set of holes in a first direction and exits the inner jar through the second set of holes;

configuring the annular gap as a return path for the pressurized fluid exiting the second set of holes to travel in a second direction opposing the first direction;

operatively connecting at least one pressure control valve to the at least one hyperbaric chamber, the at least one pressure control valve being configured to control an internal pressure of the hyperbaric chamber; and decompressing the one or more live specimens by selectively adjusting the at least one pressure control valve.

2. The method of claim 1, further comprising:

operatively connecting an inlet conduit to the first port of the chamber cap and an outlet conduit to the second port of the chamber cap such that the pressurized fluid enters the at least one hyperbaric chamber through the inlet conduit and exits the at least one hyperbaric chamber thorough the outlet conduit; and configuring the inlet conduit and the outlet conduit to withstand a respective pressure of at least 6.9 bar.

3. The method of claim 1, further comprising:

prior to fitting the chamber cap on the first outer end of the outer jar, blowing an air bubble into a cavity in the chamber cap.

4. The method of claim 1, wherein:

the first location is at a depth of between 60 meters and 150 meters below an ocean surface, the second location is at a depth of between 50 meters and 59 meters below the ocean surface and the third location is above the ocean surface.

5. The method of claim 1, wherein the annular gap is between approximately 2 cm and 5 cm.

6. The method of claim 1, further comprising:

operatively connecting a shield to the second port, the shield having a first wing at least partially encapsulating one side of the second port and a second wing at least partially encapsulating another side of the second port.

7. The method of claim 1, further comprising:

operatively connecting a controller to the at least one pressure control valve, the controller having a processor and tangible, non-transitory memory on which instructions are recorded; and selectively adjusting the at least one pressure control valve by respective predefined increments at respective predefined time intervals, via the controller.

8. The method of claim 7, further comprising:

operatively connecting a respiration sensor to the at least hyperbaric chamber, the respiration sensor being configured to monitor a health status of the one or more live specimens.

* * * * *